(12) United States Patent
Davis et al.

(10) Patent No.: US 12,292,004 B1
(45) Date of Patent: May 6, 2025

(54) COMPONENT MOUNTING AND DRIVE IN A GEARED TURBOFAN ARCHITECTURE

(71) Applicant: RTX CORPORATION, Farmington, CT (US)

(72) Inventors: Todd A. Davis, Tolland, CT (US); David Allen Stachowiak, Durham, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/411,366

(22) Filed: Jan. 12, 2024

(51) Int. Cl.
| | | |
|---|---|---|
| *F02C 7/32* | (2006.01) | |
| *F01D 15/08* | (2006.01) | |
| *F01D 15/10* | (2006.01) | |
| *F01D 15/12* | (2006.01) | |

(52) U.S. Cl.
CPC ............... *F02C 7/32* (2013.01); *F01D 15/08* (2013.01); *F01D 15/10* (2013.01); *F01D 15/12* (2013.01); *F05D 2220/76* (2013.01); *F05D 2230/60* (2013.01); *F05D 2260/4031* (2013.01)

(58) Field of Classification Search
CPC . F02C 7/32; F01D 15/08; F01D 15/10; F01D 15/12; F05D 2220/76; F05D 2230/60; F05D 2260/4031
See application file for complete search history.

(56) References Cited

U.S. PATENT DOCUMENTS

| | | | |
|---|---|---|---|
| 8,572,943 B1 * | 11/2013 | Sheridan | F02C 3/107 60/39.08 |
| 9,915,164 B2 * | 3/2018 | Roberge | F02C 7/36 |
| 10,605,165 B2 * | 3/2020 | Abe | B64C 11/02 |
| 10,634,064 B1 * | 4/2020 | Polly | F02C 7/32 |
| 10,767,568 B2 * | 9/2020 | Leque | F02C 7/268 |
| 11,220,960 B2 * | 1/2022 | Leque | F16H 3/46 |
| 11,248,532 B2 * | 2/2022 | Leque | F01D 17/24 |
| 11,313,440 B2 | 4/2022 | Harvey | |
| 11,566,566 B2 * | 1/2023 | Abe | B64C 11/14 |
| 11,754,002 B2 | 9/2023 | Niepceron et al. | |
| 11,802,514 B2 | 10/2023 | Niepceron et al. | |
| 2015/0176486 A1 * | 6/2015 | Menheere | F16H 3/72 60/792 |
| 2020/0070988 A1 * | 3/2020 | Harvey | B64D 33/08 |
| 2023/0126327 A1 | 4/2023 | Levisse et al. | |
| 2023/0313739 A1 | 10/2023 | Becoulet et al. | |

FOREIGN PATENT DOCUMENTS

| | | | |
|---|---|---|---|
| FR | 3130874 A1 | 6/2023 | |

* cited by examiner

*Primary Examiner* — Jesse S Bogue
(74) *Attorney, Agent, or Firm* — Carlson, Gaskey & Olds, P.C.

(57) ABSTRACT

A fan drive gear system for a turbine engine includes a sun gear that is configured to be driven by an engine shaft that is rotatable about an axis. The sun gear includes a first gear portion and a second gear portion. A plurality of intermediate gears are coupled to the first gear portion of the sun gear, a ring gear is coupled to the plurality of intermediate gears, a carrier supports rotation of the plurality of intermediate gears, and an accessory component is coupled to the second gear portion of the sun gear.

20 Claims, 3 Drawing Sheets

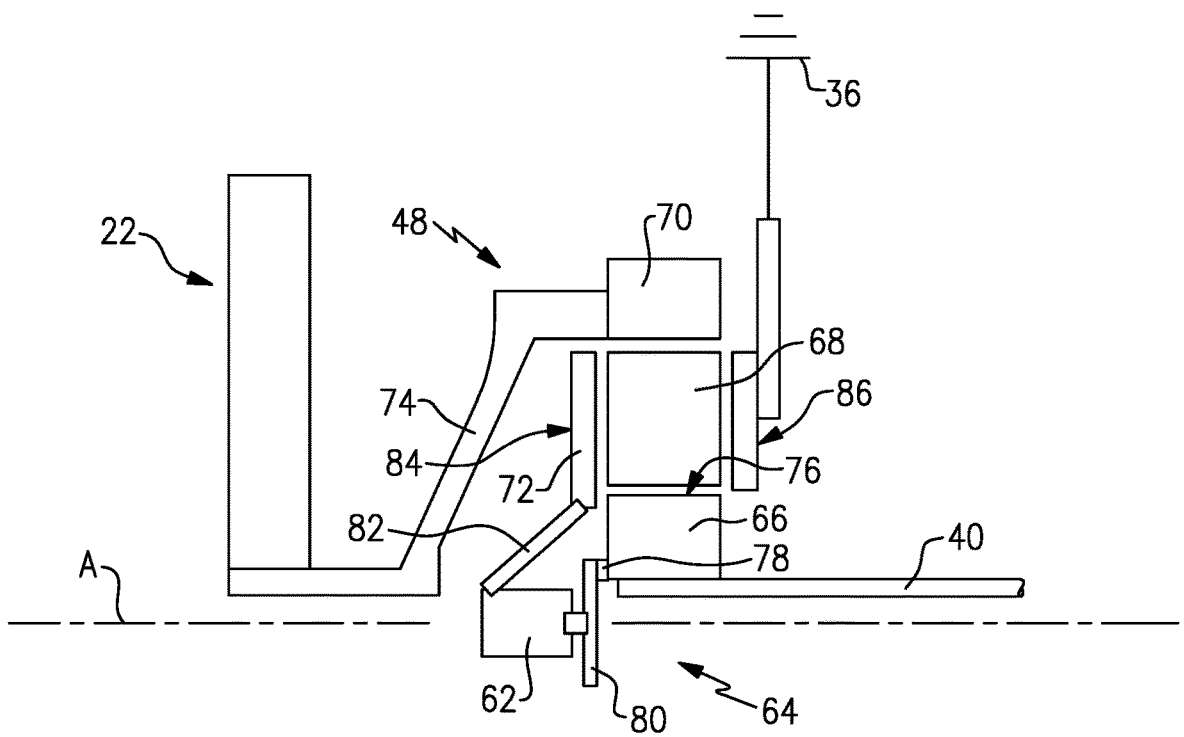
FIG.2
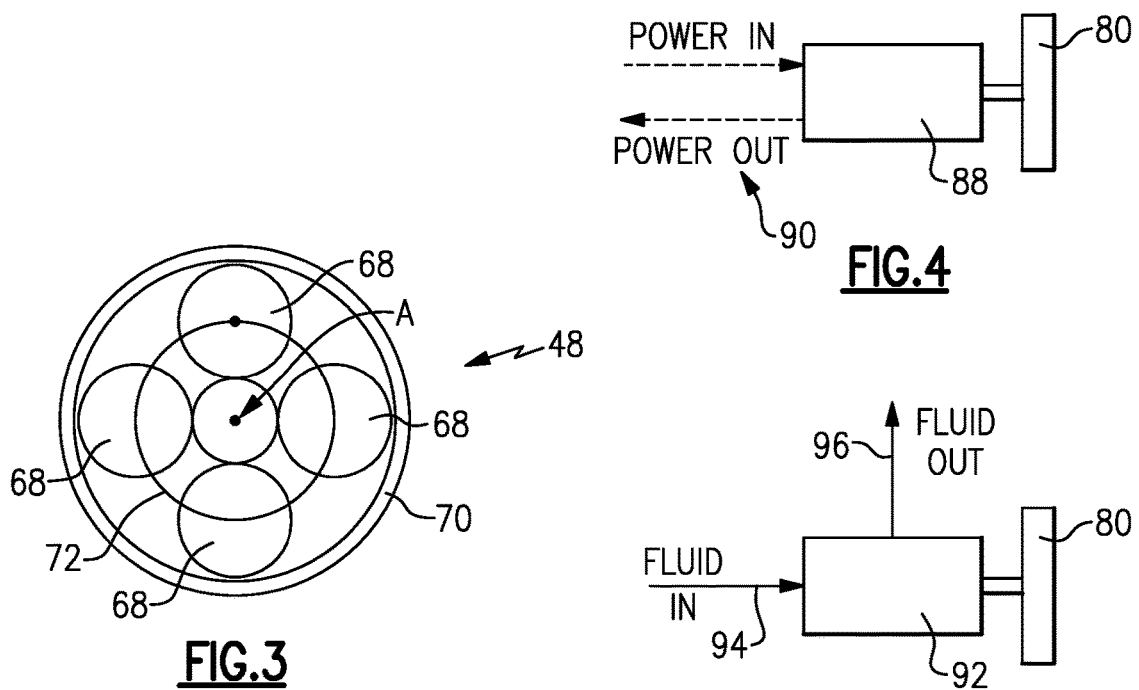
FIG.3
FIG.4
FIG.5

COMPONENT MOUNTING AND DRIVE IN A GEARED TURBOFAN ARCHITECTURE

TECHNICAL FIELD

The present disclosure relates generally to fan drive gear system for turbofan engine with a component driven by a portion of the fan drive gear system.

BACKGROUND

A turbine engine typically includes a fan section, a compressor section, a combustor section, and a turbine section. A speed reduction device such as an epicyclical gear assembly may be utilized to drive the fan section such that the fan section may rotate at a speed different than the turbine section so as to increase the overall propulsive efficiency of the engine. Accessory components such as motors and pumps are utilized to support operation of the engine. The accessory components are conventionally driven by a coupling to an engine shaft. Turbine engine manufacturers continue to seek further improvements to engine performance including improvements to thermal, transfer and propulsive efficiencies.

SUMMARY

A fan drive gear system for a turbine engine according to an exemplary embodiment of this disclosure includes, among other possible things, a sun gear that is configured to be driven by an engine shaft that is rotatable about an axis, the sun gear includes a first gear portion and a second gear portion, a plurality of intermediate gears that are coupled to the first gear portion of the sun gear, a ring gear that is coupled to the plurality of intermediate gears, a carrier that supports rotation of the plurality of intermediate gears, and an accessory component that is coupled to the second gear portion of the sun gear.

In a further embodiment of the foregoing fan drive gear system, the ring gear assembly is attached to a static engine structure and the carrier is rotatable about the axis.

In a further embodiment of any of the foregoing, the fan drive gear system further includes a flexible coupling between the ring gear and the static engine structure and the accessory component is mounted to the flexible coupling.

In a further embodiment of any of the foregoing fan drive gear systems, the accessory component is mounted downstream of the carrier to a portion of the static engine structure.

In a further embodiment of any of the foregoing fan drive gear systems, the carrier is attached to a static engine structure and the ring gear is rotatable about the axis.

In a further embodiment of any of the foregoing fan drive gear systems, the second gear portion of the sun gear is disposed upstream of the carrier.

In a further embodiment of any of the foregoing fan drive gear systems, the accessory component is mounted to a portion of the carrier.

In a further embodiment of any of the foregoing, the fan drive gear system further includes a flexible mount between the carrier and the static engine structure and both the carrier and the accessory component are mounted to the flexible mount.

In a further embodiment of any of the foregoing fan drive gear systems, the accessory component includes a fluid pump.

In a further embodiment of any of the foregoing fan drive gear systems, the accessory component includes an electric motor/generator.

A turbine engine assembly according to another exemplary embodiment of this disclosure includes, among other possible things, a static engine structure, a fan section that includes a plurality of blades that are rotatable about an axis, a fan drive gear system that includes a sun gear that is configured to be driven by an engine shaft that is rotatable about an axis, the sun gear includes a first gear portion and a second gear portion, a plurality of intermediate gears that are coupled to the first gear portion of the sun gear, a ring gear that is coupled to the plurality of intermediate gears, and a carrier that supports rotation of the plurality of intermediate gears. An accessory component is coupled to the second gear portion of the sun gear, and a fan drive shaft is coupled to a portion of the fan drive gear system to drive the fan section.

In a further embodiment of the foregoing turbine engine assembly, the ring gear assembly is attached to a static engine structure through a flexible mount. The carrier is rotatable about the axis and the accessory component is mounted to the static engine structure.

In a further embodiment of any of the foregoing turbine engine assemblies, the ring gear assembly is attached to a static engine structure through a flexible mount. The carrier is rotatable about the axis and the accessory component is mounted to the flexible coupling.

In a further embodiment of any of the foregoing turbine engine assemblies, the carrier is attached to a static engine structure through a flexible mount. The ring gear is rotatable about the axis and the accessory component is mounted to a portion of the carrier.

In a further embodiment of any of the foregoing turbine engine assemblies, the second gear portion of the sun gear is disposed upstream of the carrier.

In a further embodiment of any of the foregoing turbine engine assemblies, the accessory component includes one of a fluid pump or an electric motor/generator.

A method of powering an accessory component of a turbine engine assembly according to another exemplary embodiment of this disclosure includes, among other possible things, assembling a fan drive gear system that includes a sun gear that is configured to be driven by an engine shaft that is rotatable about an axis, the sun gear includes a first gear portion and a second gear portion, a plurality of intermediate gears that are coupled to the first gear portion of the sun gear, a ring gear that is coupled to the plurality of intermediate gears, and a carrier that supports rotation of the plurality of intermediate gears. An accessory component is mounted proximate the fan drive gear system, and a gear portion of the accessory component is coupled to the second gear portion of the sun gear. A fan drive shaft is coupled to a portion of the fan drive gear system to drive a fan section.

In a further embodiment of the foregoing, the method further includes assembling the fan drive gear system such that the ring gear assembly is attached to a static engine structure through a flexible mount. The carrier is rotatable about the axis and the accessory component is mounted to the static engine structure.

In a further embodiment of any of the foregoing, the method further includes assembling the fan drive gear system such that the ring gear assembly is attached to a static engine structure through a flexible mount. The carrier is rotatable about the axis and the accessory component is mounted to the flexible coupling.

In a further embodiment of any of the foregoing, the method further includes assembling the fan drive gear system such that the carrier is attached to a static engine structure through a flexible mount. The ring gear is rotatable about the axis and the accessory component is mounted to a portion of the carrier.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 2 is a schematic view an example fan drive gear system embodiment.

FIG. 3 is another schematic view of the example fan drive gear system embodiment shown in FIG. 2.

FIG. 4 is a schematic view of an example accessory component embodiment.

FIG. 5 is a schematic view of another example accessory component embodiment.

DETAILED DESCRIPTION

Figure 1:
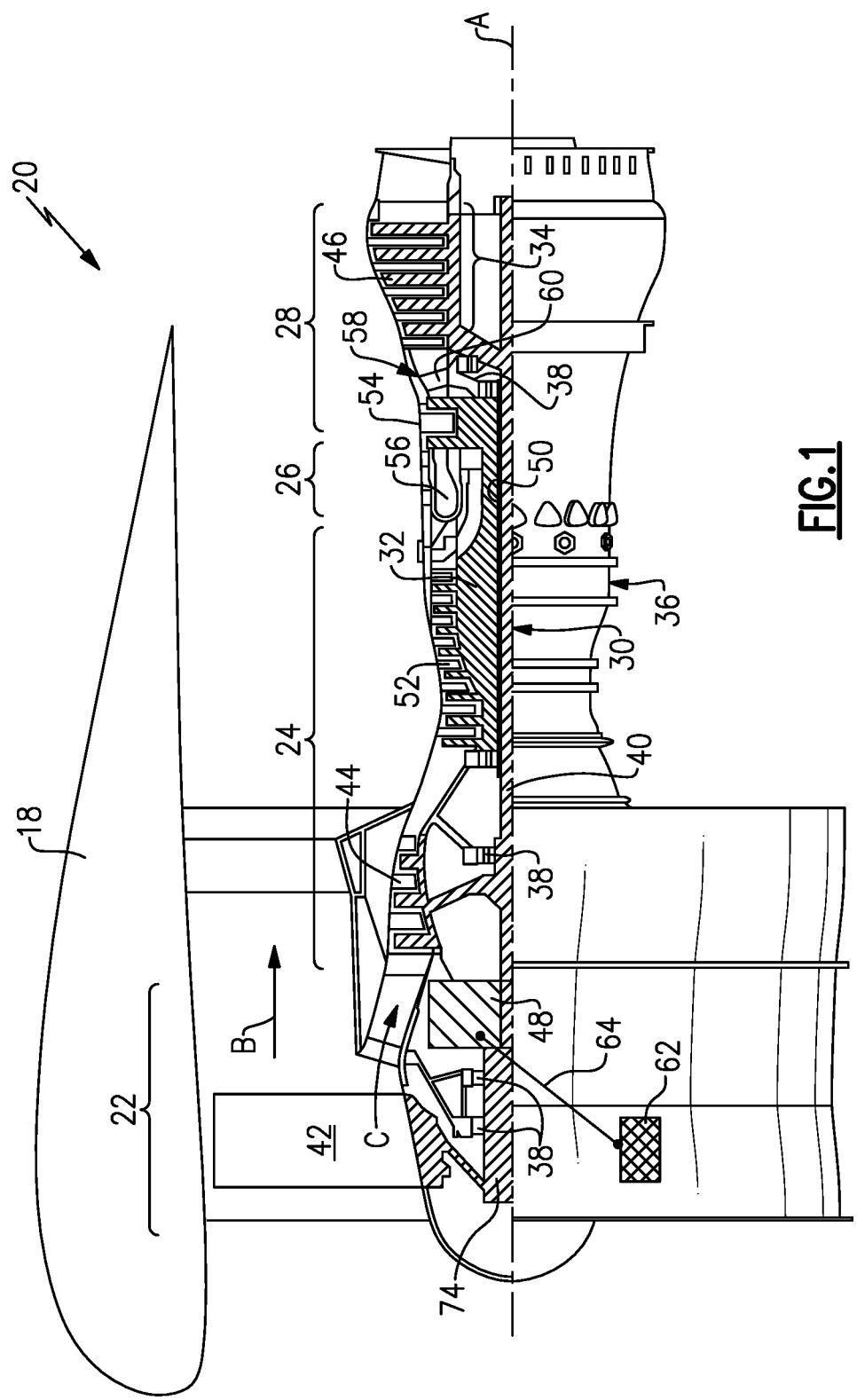
FIG. 1 is a schematic view of an example gas turbine engine including a fan drive gear system.

FIG. 1 schematically illustrates a gas turbine engine 20 with an epicyclic fan drive gear system 48 that drives a fan section 22 and an accessory component 62. The accessory component is driven through a coupling 64 to a portion of the gear system 48.

The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures, turbofans, turboprop, open rotor configurations and any other gas turbine engine architecture.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22 through a speed change mechanism, which in exemplary gas turbine engine 20 is illustrated as the fan drive gear system 48 to drive the fan section 22 at a lower speed than the low speed spool 30. The high speed spool 32 includes an outer shaft 50 that interconnects a second (or high) pressure compressor 52 and a second (or high) pressure turbine 54. The low pressure turbine 46 includes a plurality of turbine rotors 34. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, the fan drive gear system 48 may be located aft of the low pressure compressor 44, or aft of the combustor section 26 or even aft of turbine section 28, and fan section 22 may be positioned forward or aft of the fan drive gear system 48.

The engine 20 in one example is a high-bypass geared aircraft engine. the example engine 20 includes a bypass ratio greater than 20, with an example embodiment being greater than 32 and less than 72.

The fan drive gear system 48 is an epicycle gear train with a gear reduction ratio of greater than about 2:1 and less than about 18:1. In another example embodiment, the fan drive gear system 48 provides a gear reduction ratio of between 5:1 and 14:1. The gear system 48 is coupled to a fan shaft 74 to drive the fan section 22 about the engine axis A. It should be understood, however, that the above parameters are only exemplary of one embodiment of a geared engine architecture and that the present disclosure is applicable to other gas turbine engine architectures including turbofan, turboshaft, and open rotor engines.

Referring to FIGS. 2 and 3 with continued reference to FIG. 1, the example fan drive gear system 48 is an epicyclic gear system with a sun gear 66 engaged to a plurality of intermediate gears 68 supported by a carrier 72. A ring gear 70 circumscribes the intermediate gears 68 and is driven by the intermediate gears 68. In the example embodiment shown in FIG. 2, the ring gear 70 rotates about the axis A provides a drive output through the fan shaft 74 that drives the fan section 22. The carrier 72 is attached to a static engine structure 36. Accordingly, example epicyclic gear system 48 may be referred to as a star gear system with the intermediate gears 68 also referred to a star gears.

The attachment of the carrier 72 to the engine static structure could be a fixed or a flexible mounting. A fixed mounting is a substantially rigid mounting where a flexible mounting provides some intended flexibility to allow movement that accommodates relative misalignment or movement between mated parts. In the disclosed examples, portions of the fan drive gear system 48 that do not rotate about the engine axis and are attached to the engine static structure may be fixed or flexibly mounted and remain within the scope and contemplation of this disclosure. Moreover, in some embodiments, components may be fixed to each other while the combination of components are flexibly mounted to the engine static structure.

The sun gear 66 includes a first gear portion 76 and a second gear portion 78. The first gear portion engages and drives the intermediate gears 68. The second gear portion 78 is engaged to an accessory gear 80 to drive the accessory component 62. In one disclosed example, the second gear portion 78 is disposed on an engine forward side of the sun gear 66. The accessory component 62 is mounted to an engine forward side 84 of the carrier 72. The example carrier 72 is mounted to the static engine structure 36 on an engine aft side 86.

The example accessory component 62 is schematically shown as being disposed about the axis A. However, the accessory component 62 may be offset or otherwise arranged relative to the axis A and remain within the contemplation and scope of this application.

Referring to FIGS. 4 and 5 with continued reference to FIG. 2, the accessory component 62 may be any device that is driven to support engine operation. In one example embodiment, the accessory component is an electric motor/generator 88 as shown in FIG. 4 that operates to either received or produce electric power 90. In another example embodiment, the accessory component is a fluid pump 92 as shown in FIG. 5. The example fluid pump 92 receives in inlet fluid flow 94 and exhausts an outlet flow 96 and an increased pressure or flow as compared to the inlet fluid flow 94. The fluid pump 92 may pump lubricant, fuel, hydraulic fluid, and/or any other fluid utilized in support of engine and aircraft operation.

Figure 6:
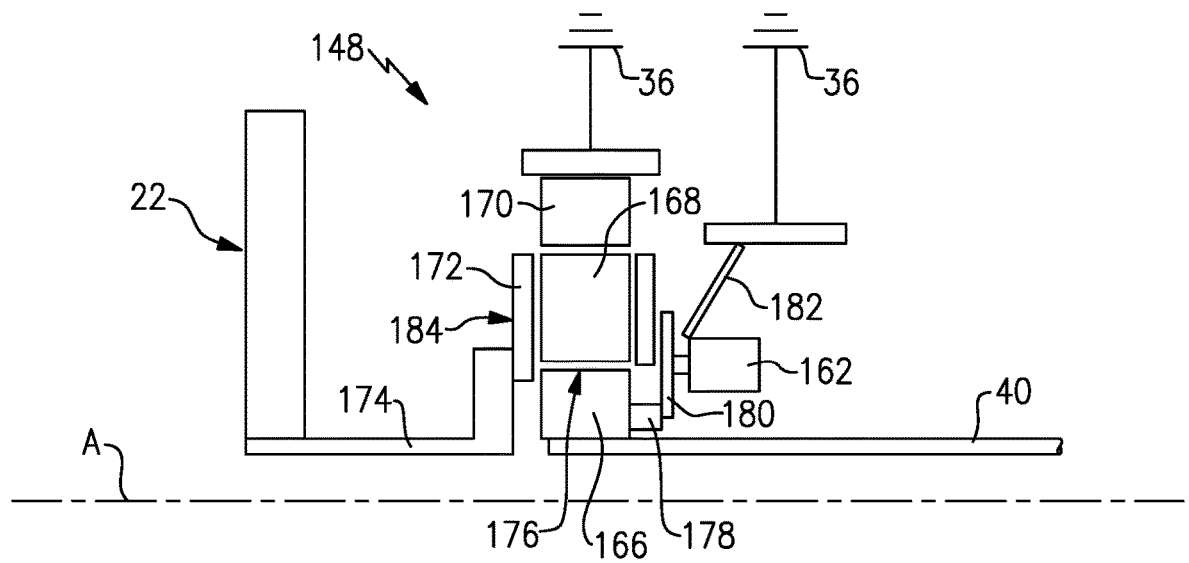
FIG. 6 schematic view of another example fan drive gear system.

Referring to FIG. 6, another example fan drive gear system 148 includes a sun gear 166 driven by an engine shaft 40 about the axis A. The sun gear 166 includes a first gear portion 176 that engages and drives a plurality of intermediate gears 168 supported in a rotatable carrier 172. A ring gear 170 is fixed to the static engine structure 36. A forward side 184 of the carrier 172 is attached to drive the fan 22 through a fan shaft 174. The example gear system 148 is commonly referred to as a planet gear system because the intermediate gears 168 rotate about the sun gear 166 and engine axis A while the ring gear 170 remains fixed.

An accessory component 162 is driven by a second gear portion 178 of the sun gear 166 through an accessory gear 180. The accessory component 162 is supported on an aft, or downstream side of the fan drive gear system 148 through a mount portion 182 attached to the static engine structure 36. The mount portion 182 may provide either a fixed mounting or a flexible mount to accommodate relative movement between the accessory gear 180 and the second gear portion 178. The mount portion 182 may be arranged to allow movement of the accessory gear 180 to maintain a desired engagement with the second gear portion 178.

The second gear portion 178 is also disposed on the aft side of the gear system 148 because the coupling of the fan shaft 174 to a forward side of the carrier 184 reduces the amount of space available for mounting of additional components. Moreover, the size of the accessory component 162 and the attachment to the engine static structure may necessitate mounting aft of the gear system 148.

The accessory component 162 is offset from the engine axis A. In this example, the accessory gear 180 rotates about an axis substantially parallel to the engine axis A. However, the accessory gear 180 and second gear portion 178 may be differently configured to provide non parallel mounting configurations.

The example accessory component 162 may be one of a pump, electric motor/generator or any other device that supports engine and/or aircraft operation. Driving the component 162 from the gear system 148 can provides advantageous alternatives to other drive and mounting conventions.

Figure 7:
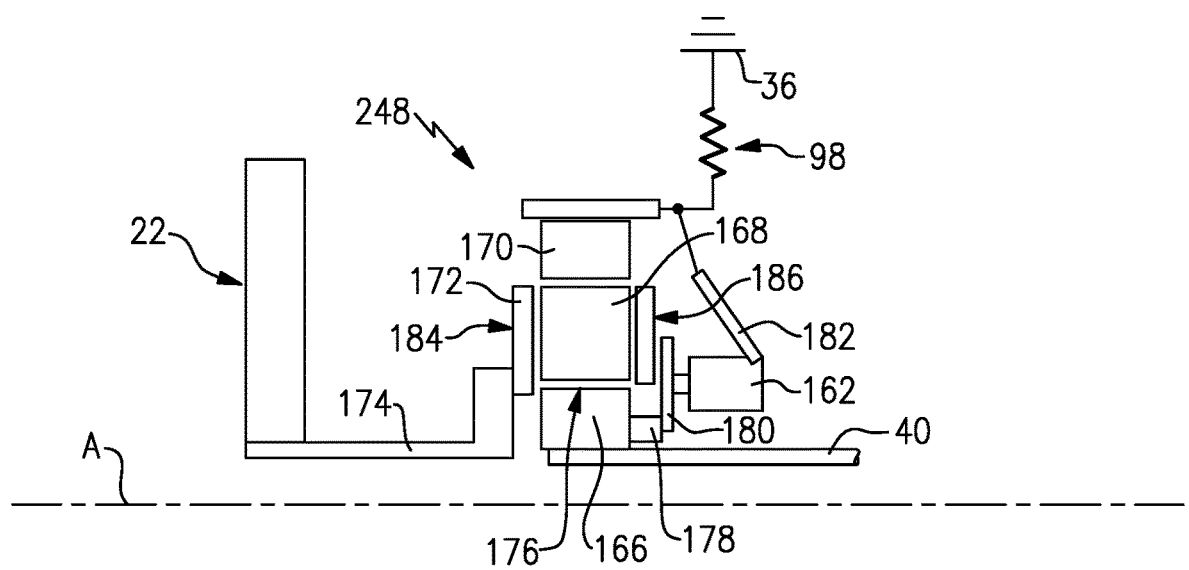
FIG. 7 is a schematic view of yet another example fan drive gear system.

Referring to FIG. 7, another example fan drive gear system 248 is shown and includes features similar to those previous described with regard to the fan drive gear system 148 shown in FIG. 6. In this example embodiment, the accessory component 162 and the ring gear 170 are mounted to the static engine structure 36 through a flexible mount 98. The flexible mount 98 provides for some movement of the ring gear 170 to accommodate movement of other gear components to maintain relative gear alignment between the ring gear 170 and the intermediate gears 168.

The mount 182 supporting the accessory component 162 may be substantially rigid to provide for movement with the ring gear 170. The flexible mount 98 provides for movement of both the ring gear 170 and the accessory component 162 as a single unit. Accordingly, the flexible mount 98 allows some movement of the accessory component 162 and the ring gear 170, together, to accommodate relative movement with the sun gear 166 and the second gear portion 178.

Accordingly, the example fan drive gear systems provide for operation and driving of accessory components.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A fan drive gear system for a turbine engine comprising:
   a sun gear configured to be driven by and coaxial with an engine shaft rotatable about an axis, the sun gear including a first gear portion and a second gear portion;
   a plurality of intermediate gears coupled to the first gear portion of the sun gear;
   a ring gear coupled to the plurality of intermediate gears;
   a carrier supporting rotation of the plurality of intermediate gears; and
   an accessory component that is coupled to the second gear portion of the sun gear through an accessory gear.

2. The fan drive gear system as recited in claim 1, wherein the ring gear assembly is attached to a static engine structure and the carrier is rotatable about the axis.

3. The fan drive gear system as recited in claim 2, further comprising a flexible coupling between the ring gear and the static engine structure and the accessory component is mounted to the flexible coupling.

4. The fan drive gear system as recited in claim 2, wherein the accessory component is mounted downstream of the carrier to a portion of the static engine structure.

5. The fan drive gear system as recited in claim 1, wherein the carrier is attached to a static engine structure and the ring gear is rotatable about the axis.

6. The fan drive gear system as recited in claim 5, wherein the second gear portion of the sun gear is disposed upstream of the carrier.

7. The fan drive gear system as recited in claim 6, wherein the accessory component is mounted to a portion of the carrier.

8. The fan drive gear system as recited in claim 7, further comprising a flexible mount between the carrier and the static engine structure and both the carrier and the accessory component are mounted to the flexible mount.

9. The fan drive gear system as recited in claim 1, wherein the accessory component comprises a fluid pump.

10. The fan drive gear system as recited in claim 1, wherein the accessory component comprises an electric motor/generator.

11. A turbine engine assembly comprising:
- a static engine structure;
- a fan section including a plurality of blades rotatable about an axis;
- a fan drive gear system including a sun gear configured to be driven by and coaxial with an engine shaft rotatable about an axis, the sun gear including a first gear portion and a second gear portion, a plurality of intermediate gears coupled to the first gear portion of the sun gear, a ring gear coupled to the plurality of intermediate gears, and a carrier supporting rotation of the plurality of intermediate gears;
- an accessory component that is coupled to the second gear portion of the sun gear through an accessory gear; and
- a fan drive shaft coupled to a portion of the fan drive gear system to drive the fan section.

12. The turbine engine assembly as recited in claim 11, wherein the ring gear assembly is attached to a static engine structure through a flexible mount, the carrier is rotatable about the axis and the accessory component is mounted to the static engine structure.

13. The turbine engine assembly as recited in claim 11, wherein the ring gear assembly is attached to a static engine structure through a flexible mount, the carrier is rotatable about the axis and the accessory component is mounted to the flexible coupling.

14. The turbine engine assembly as recited in claim 11, wherein the carrier is attached to a static engine structure through a flexible mount, the ring gear is rotatable about the axis and the accessory component is mounted to a portion of the carrier.

15. The turbine engine assembly as recited in claim 11, wherein the second gear portion of the sun gear is disposed upstream of the carrier.

16. The turbine engine assembly as recited in claim 11, wherein the accessory component comprises one of a fluid pump or an electric motor/generator.

17. A method of powering an accessory component of a turbine engine assembly comprising:
- assembling a fan drive gear system including a sun gear configured to be driven by and coaxial with an engine shaft rotatable about an axis, the sun gear including a first gear portion and a second gear portion, a plurality of intermediate gears coupled to the first gear portion of the sun gear, a ring gear coupled to the plurality of intermediate gears, and a carrier supporting rotation of the plurality of intermediate gears;
- mounting an accessory component proximate the fan drive gear system;
- coupling a gear portion of the accessory component to the second gear portion of the sun gear; and
- coupling a fan drive shaft to a portion of the fan drive gear system to drive a fan section.

18. The method as recited in claim 17, further comprising assembling the fan drive gear system such that the ring gear assembly is attached to a static engine structure through a flexible mount, the carrier is rotatable about the axis and the accessory component is mounted to the static engine structure.

19. The method as recited in claim 17, further comprising assembling the fan drive gear system such that the ring gear assembly is attached to a static engine structure through a flexible mount, the carrier is rotatable about the axis and the accessory component is mounted to the flexible coupling.

20. The method as recited in claim 17, further comprising assembling the fan drive gear system such that the carrier is attached to a static engine structure through a flexible mount, the ring gear is rotatable about the axis and the accessory component is mounted to a portion of the carrier.

* * * * *